(12) United States Patent
Badri et al.

(10) Patent No.: US 11,703,612 B2
(45) Date of Patent: Jul. 18, 2023

(54) METHODS AND SYSTEMS FOR CHARACTERIZING A HYDROCARBON-BEARING ROCK FORMATION USING ELECTROMAGNETIC MEASUREMENTS

(71) Applicant: Schlumberger Technology Corporation, Sugar Land, TX (US)

(72) Inventors: Mohammed Badri, Al-Khobar (SA); Ping Zhang, Beijing (CN); Wael Abdallah, Al-Khobar (SA)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 416 days.

(21) Appl. No.: 16/912,666

(22) Filed: Jun. 25, 2020

(65) Prior Publication Data
US 2021/0405247 A1 Dec. 30, 2021

(51) Int. Cl.
| | | |
|---|---|---|
| G01V 99/00 | (2009.01) | |
| G01V 3/18 | (2006.01) | |
| G06F 30/20 | (2020.01) | |
| E21B 49/00 | (2006.01) | |
| E21B 43/16 | (2006.01) | |
| G06F 113/08 | (2020.01) | |
| E21B 43/00 | (2006.01) | |
| G01V 3/08 | (2006.01) | |
| G01V 11/00 | (2006.01) | |

(52) U.S. Cl.
CPC .......... *G01V 99/005* (2013.01); *E21B 43/00* (2013.01); *E21B 49/00* (2013.01); *G01V 3/08* (2013.01); *G01V 3/18* (2013.01); *G01V 11/00* (2013.01); *G06F 30/20* (2020.01); *E21B 43/16* (2013.01); *E21B 2200/20* (2020.05); *G01V 2210/66* (2013.01); *G06F 2113/08* (2020.01)

(58) Field of Classification Search
CPC .......... G01V 99/005; G01V 3/18; G01V 3/08; G01V 11/00; G01V 2210/66; G06F 30/20; G06F 2113/08; E21B 49/00; E21B 2200/20; E21B 43/16; E21B 43/00
USPC ........................................... 703/10
See application file for complete search history.

(56) References Cited

U.S. PATENT DOCUMENTS

| | | |
|---|---|---|
| 4,716,973 A | 1/1988 | Cobern |
| 5,251,286 A | 10/1993 | Wiener et al. |
| 6,061,634 A | 5/2000 | Belani et al. |
| 8,901,931 B2 | 12/2014 | Esmersoy |
| 2011/0184711 A1 | 7/2011 | Altman et al. |
| 2012/0330553 A1* | 12/2012 | Mollaei .................. E21B 43/16 702/11 |
| 2017/0307772 A1* | 10/2017 | Jutila ........................ G01V 1/42 |
| 2021/0080371 A1* | 3/2021 | Johns ................. G01N 15/0806 |

(Continued)

OTHER PUBLICATIONS

Dussan et al., "Estimating Vertical Permeability from Resistivity Logs," SPWLA 35th Annual Logging Symposium, Jun. 19-22, 1994.

(Continued)

*Primary Examiner* — John E Johansen

(57) ABSTRACT

Methods and systems are provided for characterizing a subterranean formation that involve the generation of four 3D geological model of the formation that are updated before and after an enhanced hydrocarbon production process.

18 Claims, 5 Drawing Sheets

(56) References Cited

U.S. PATENT DOCUMENTS

2021/0264262 A1* 8/2021 Colombo ................. G01V 3/00
2021/0333429 A1* 10/2021 Hou ....................... E21B 49/00

OTHER PUBLICATIONS

Kuchuk, et al., "Determination of in-situ two-phase flow properties through downhole fluid movement monitoring," SPE Annual Technical Conference and Exhibition, Sep. 21-24, 2008, Denver, Colorado, USA.

Ma, et al., "Integration of Static and Dynamic Data for Enhanced Reservoir Characterization, Geological Modeling and Well Performance Studies," SPE Annual Technical Conference and Exhibition held in New Orleans, Louisiana, USA, Sep. 30-Oct. 2, 2013.

* cited by examiner

Base Survey – before EOR

Time-Lapse Survey – after EOR

METHODS AND SYSTEMS FOR CHARACTERIZING A HYDROCARBON-BEARING ROCK FORMATION USING ELECTROMAGNETIC MEASUREMENTS

FIELD

The present disclosure relates to methods and systems that characterize spatial distributions of relative permeabilities and capillary pressure in a hydrocarbon-bearing rock formation.

BACKGROUND

The permeability of a hydrocarbon-bearing rock formation (also referred to as a reservoir) is a measure of its specific flow capacity. For a single fluid phase, it is called absolute permeability. For multiple fluid phases, it is called relative permeability and it quantifies the amount of flow for each phase in the presence of the other under applied pressure. Specifically, the relative permeability of a phase is a dimensionless measure of the effective permeability of that phase and can be represented as the ratio of the effective permeability of that phase to absolute permeability.

Permeability is one of the most critical and essential flow parameters associated with the characterization and production of a hydrocarbon reservoir. The permeability of a reservoir is fundamentally a measure of the inter-connectedness of the available porosity which determines how easily fluid can pass through it. Very low permeability can indicate non-connected porosity, such as micro-porosity, which can have profound impact on the fluid transportations. For example, relative permeabilities of oil and water can be parameters that are used to forecast oil recovery during water flooding or natural water drives. Thus, the economic viability of a reservoir can depend upon the nature of these saturation dependent relative permeabilities.

Generally, relative permeabilities are obtained from measurements on core samples acquired by downhole coring, which are expensive, time consuming and only provide static and local measurements. Determining in-situ relative permeabilities and capillary pressure is more appealing and has been the subject of active research for many years.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

The subject disclosure relates to methods and system that characterize a subterranean formation by constructing or generating a three-dimensional (3D) geological model of the formation. The 3D geological model of the formation can be used in conjunction with a fluid-flow simulator to generate a first 3D distribution of resistivity of the formation. Electromagnetic survey data of the formation can be collected and used to generate a second 3D distribution of resistivity of the formation. The 3D geological model of the formation can be updated based on differences between the first and second 3D distributions of resistivity of the formation. The fluid-flow simulation and subsequent update to the 3D geological model can be repeated until differences between the first and second 3D distributions of resistivity of the formation satisfy a stopping criterion. Data characterizing properties of the formation can be extracted from the resulting 3D geological model.

In embodiments, the 3D geological model can include distributions of formation properties selected from the group consisting of relative permeabilities, horizontal and vertical relative permeabilities, capillary pressure, water saturation and oil saturation.

In embodiments, the operations can be performed in conjunction with time-lapsed electromagnetic measurements before and after subjecting the formation to secondary or tertiary enhanced oil recovery process, and the extracted data can be analyzed to identify variations (such as fractures) in the formation that results from the enhanced oil recovery process. The time-lapsed operations can also be executed during formation primary production.

In embodiments, the extracted data can represent at least one formation property selected from the group consisting of relative permeabilities, horizontal and vertical relative permeabilities, capillary pressure, water saturation, and oil saturation.

In embodiments, the operations can employ history matching to production data to adjust at least one of the 3D geological model and the fluid-flow simulator, which can increase the accuracy of the 3D resistivity distribution produced from the 3D geological model and simulation.

In embodiments, the 3D geological model and fluid-flow simulator can be configured to estimate 3D distributions of pressure, salinity, oil saturation and water saturation in the formation, which are used to determine the first 3D distribution of resistivity of the formation.

In embodiments, differences between the first and second 3D resistivity distributions can be used to update 3D distributions of salinity and water saturation of the formation. The updated 3D distributions of salinity and water saturation of the formation can be used to update transport parameters related to localized relative permeabilities and capillary pressure of the formation. The updated transport parameters can be used to update the 3D geological model of the formation.

In embodiments, the electromagnetic survey data can be obtained from at least one of cross-well electromagnetic measurements, surface-to-borehole electromagnetic measurements, and borehole-to-surface electromagnetic measurements.

In embodiments, the operations, or a part thereof, can be performed by a processor.

A related computer processing system is provided that can be configured to carry out the methodology or parts thereof.

A related tangible, non-transitory computer readable medium is also provided, which has instructions that are executed by a processor to carry out the methodology or parts thereof.

BRIEF DESCRIPTION OF THE DRAWINGS

The subject disclosure is further described in the detailed description which follows, in reference to the noted plurality of drawings by way of non-limiting examples of the subject disclosure, in which like reference numerals represent similar parts throughout the several views of the drawings, and wherein.

DETAILED DESCRIPTION

Figure 1A:
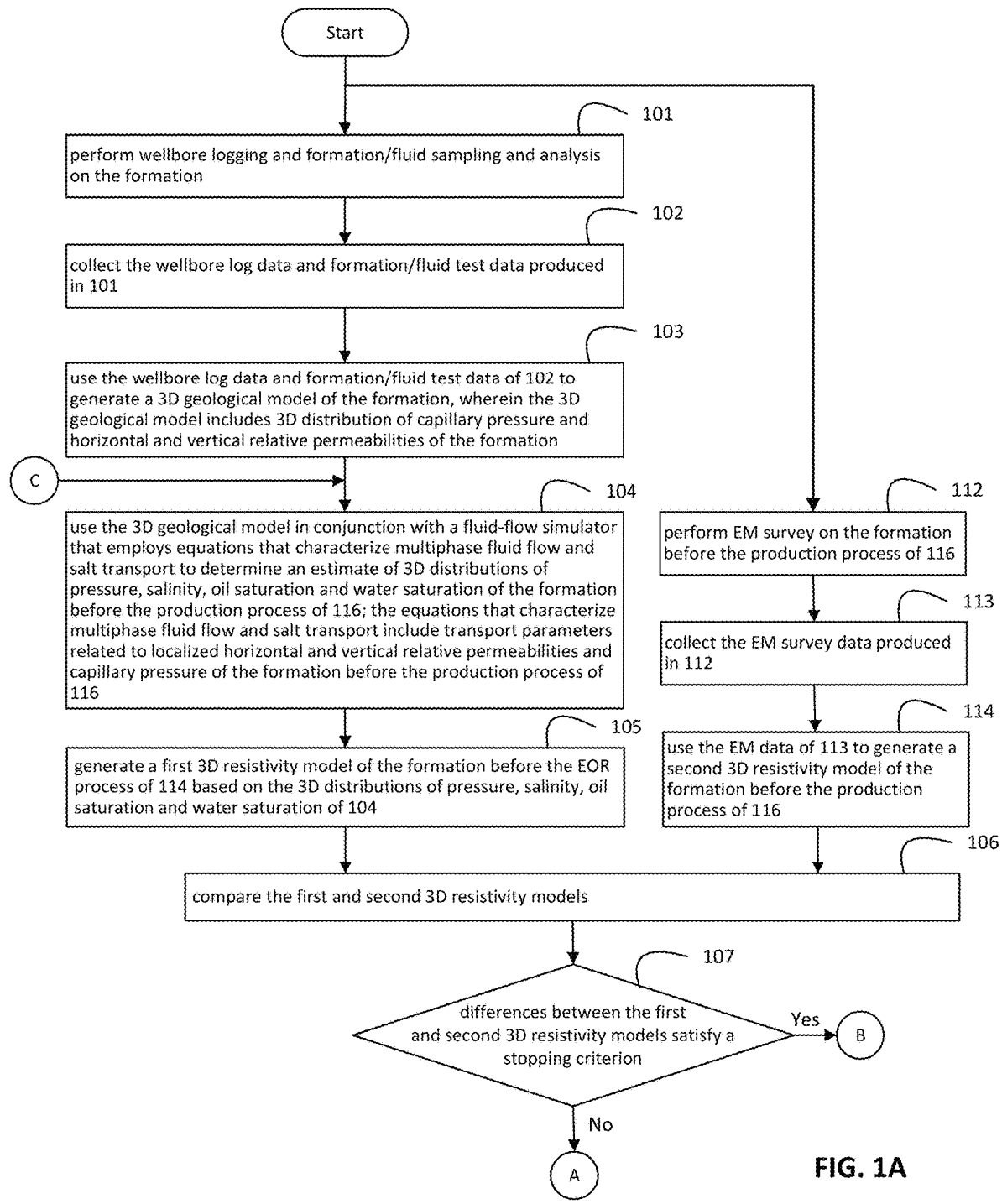
FIGS. 1A-1C, collectively, is a flow chart illustrating operations of a framework for characterizing distributions of relative permeabilities and capillary pressure in a hydrocarbon-bearing rock formation using time-lapse electromagnetic measurements in accordance with embodiments of the present disclosure.

The particulars shown herein are by way of example and for purposes of illustrative discussion of the embodiments of the subject disclosure only and are presented in the cause of providing what is believed to be the most useful and readily understood description of the principles and conceptual aspects of the subject disclosure. In this regard, no attempt is made to show structural details in more detail than is necessary for the fundamental understanding of the subject disclosure, the description taken with the drawings making apparent to those skilled in the art how the several forms of the subject disclosure may be embodied in practice. Furthermore, like reference numbers and designations in the various drawings indicate like elements.

As used herein, a "production process" is a process that produces hydrocarbons from a hydrocarbon-bearing rock formation. The production process can be logically partitioned into a sequence of stages, including primary production, secondary production and possibly tertiary production. In the primary production stage, the natural reservoir energy (such as gasdrive, waterdrive or gravity drainage) displaces hydrocarbons from the reservoir, into the wellbore and up to the surface. Initially, the reservoir pressure is considerably higher than the bottomhole pressure inside the wellbore. This high natural differential pressure drives hydrocarbons toward the well and up to surface. However, as the reservoir pressure declines because of production, so to will the differential pressure. To reduce the bottomhole pressure or increase the differential pressure to increase hydrocarbon production, it may be necessary to implement an artificial lift system, such as a rod pump, an electrical submersible pump or a gas-lift installation. Production using artificial lift is considered primary production. The primary production stage typically reaches its limit either when the reservoir pressure is so low that the production rates are not economical, or when the proportions of gas or water in the production stream are too high. In the secondary production stage, an external fluid such as water or gas can be injected into the reservoir through one or more injection wells located in rock that has fluid communication with one or more production wells. The purpose of secondary production stage is to maintain reservoir pressure and to displace hydrocarbons toward the production well(s). Common techniques employed in the secondary production stage are gas injection and waterflooding. Other EOR processes can also be used. The secondary production stage typically reaches its limit when the injected fluid (water or gas) is produced in considerable amounts from the production well(s) and the production is no longer economical. In the tertiary production stage, one or more enhanced-oil recovery processes can be used to maintain reservoir pressure and displace hydrocarbons toward the production well(s). Common techniques employed in the tertiary production stage are thermal methods, gas injection and chemical flooding. Other EOR processes can also be used.

As used herein, an "enhanced-oil recovery (EOR) process" is a process that treats a hydrocarbon-bearing rock formation in order to stimulate hydrocarbon production from the formation. The treatment typically involves injecting fluid into the formation. The fluid can be water-based (such as for water flooding or steam-flooding), a gas (such as carbon dioxide, nitrogen or natural gas for gas flooding), or one or more chemicals (such as surfactants, emulsions, solvents or polymers for chemical flooding). In waterflooding, the water can be sourced from production fluids, seawater, river water or aquifer water. Extraction and treatment (such as filtration, deoxygenation and/or biociding) of the sourced water can be required before injection. The treatment can also involve the introduction of heat into the formation to stimulate hydrocarbon production from the formation. For example, fire flooding employs combustion of oil in the formation itself to generate the heat within the formation. As the fire burns, it moves through the formation toward one or more production wells. Heat from the fire reduces oil viscosity and helps vaporize reservoir water to steam. The steam, hot water, combustion gas and a bank of distilled solvent all act to drive oil in front of the fire toward the production well(s). In another example, a plasma pulse generator can be run in the well and operated to create a pulse of plasma at very high temperature. This in turn creates hydraulic impulse acoustic waves that are powerful enough to clean perforations and near wellbore damage. These waves continue to resonate deep into the formation, exciting the fluid molecules and possibly breaking larger hydrocarbon molecules to smaller ones and simultaneously reducing adhesion tension which results in increased mobility of hydrocarbons. The treatment can also involve the injection of microbes into the formation to stimulate hydrocarbon production from the formation.

As used herein, a "three-dimensional (3D) geological model" is a 3D model of a specific volume of a subsurface that represents geologic attributes of a hydrocarbon-bearing formation. The attributes can include structural shape and thicknesses of the formation, lithology (such as rock type, grain size, mineral composition), distributions of porosity, capillary pressure, relative permeabilities, fluid saturations, and possibly other reservoir parameters over locations with the volume of the formation. The attributes can vary from location to location within the volume, resulting in heterogeneity of the geologic attributes of the formation. The 3D geological model typically employs a three-dimensional grid or mesh that supports the volumetric representation of the formation.

As used herein a "three-dimensional (3D) resistivity model" is a 3D model of resistivity of a specific volume of hydrocarbon-bearing formation. The resistivity can vary from location to location within the volume, resulting in heterogeneity of the resistivity of the formation.

Reservoir multiphase transport properties, such as horizontal and vertical relative permeabilities and capillary pressure, are important parameters that affect almost all phases of reservoir management. Relative permeability heterogeneity, especially that induced by formation stratification, plays critical roles in well placement and sweep efficiency within production processes (such as EOR processes). For example, stratified and interwell heterogeneities can dictate fluid movement and waterflooding efficiency. Having a clear understanding of the distribution of relative permeabilities within a reservoir can help to map fluid distributions and find by-passed oil.

Current practices characterize relative permeabilities and capillary pressure of a reservoir through extensive model simulations based on extensive borehole logs. For instance, open hole logs provide continuous, detailed vertical results of porosity, formation resistivity and lithology compositions. These static properties can be correlated with dynamic properties, such as permeability and pressure. However, the depth of the investigation of wireline logs is usually very shallow and will not have any lateral resolution.

A wireline formation tester is often utilized to obtain in situ permeability values using a single probe, multiple probes, or packer-probe set-ups in pretests or interval pressure transient tests (IPTT) at discrete locations along a wellbore. Although in situ and dynamic permeability estimated from single probe pretests can be affected by the mud-filtrate invade zone. Among these measurements, only IPTT provides three-dimensional data for the estimation of horizontal and vertical permeability distributions with 30 ft to 60 ft lateral radius from the wellbore. However, formation models for interpretation rely on logs that have smaller radii of investigation. Therefore, the formation models may overlook some key features that cross the wellbore.

All of the data sources and measurements discussed above are invaluable and indispensable for reservoir characterization and evaluation. Another key parameter for formation evaluation is subsurface resistivity. Currently only borehole resistivity logs are used in the process, which allows the relative permeability being determined near the wellbore. To understand the transport properties in a large scale, one relies on statistical methods of interpolating properties from the boreholes being surveyed. Very often these boreholes are far apart, making the interpolation results unreliable. Furthermore, the statistic method cannot address the issues related with stratified and interwell heterogeneities which are key factors that dictate fluid movement and waterflooding efficiency, especially in vertically varying fluid units.

In recent years, cross-well electromagnetic (EM) measurements, surface-to-borehole (STB) EM measurements and borehole-to-surface (BTS) EM measurements have been developed to measure subsurface resistivity. For cross-well EM measurements, an EM signal is generated by an electromagnetic induction transmitter in one wellbore and measured by an EM receiver array located in another wellbore. The transmitter can be configured to broadcast a continuous sinusoidal signal at programmable frequencies. The measurements can be subject to tomographic processing to create a 3D map of resistivity of the area between the wellbores. For STB EM measurements, EM signals are generated by surface-located EM transmitters and measured by a receiver array located in a wellbore. The measurements can be subject to processing to create a 3D map of resistivity of the area between the surface and the wellbore. For BTS EM measurements, EM signals are generated by an EM transmitter located in a wellbore and measured by an array of EM receivers located on the surface. The measurements can be subject to processing to create a 3D map of resistivity of the area between the wellbore and the surface. Details of cross-well, STB and BTS EM measurements are described in U.S. Pat. No. 8,901,931 to Cengiz Esmersoy, commonly assigned to the assignee of the present disclosure. These EM measurements can define a distribution of subsurface resistivity at reservoir scale and provide excellent spatial resolution for the measured resistivity.

In embodiments, subsurface resistivity distribution data can be used together with borehole logs to estimate localized fluid transport properties (particularly 3D distributions of horizontal and vertical relative permeabilities and capillary pressure) for a reservoir volume. The estimates for these localized fluid transport properties can then be used to identify and study heterogeneities of the horizontal and vertical relative permeabilities and capillary pressures.

Furthermore, time-lapse EM measurements (such as cross-well, STB and BTS EM measurements at different points in time) can be performed for the same reservoir. The result data of such time-lapse EM measurements can be used to determine a subsurface resistivity distribution data as a function of time, and the resulting subsurface resistivity distribution data over time can be used to identify and study changes of the transport properties as a function of time. For example, the EM measurements data can be collected before and after carrying out a production process to determine relative permeability distributions and capillary pressure distributions before and after carrying out the production process. The changes (differences) in such distributions can be analyzed to understand the mobility variations of oil and water due to the production process (such as fluid injection).

Figure 1B:
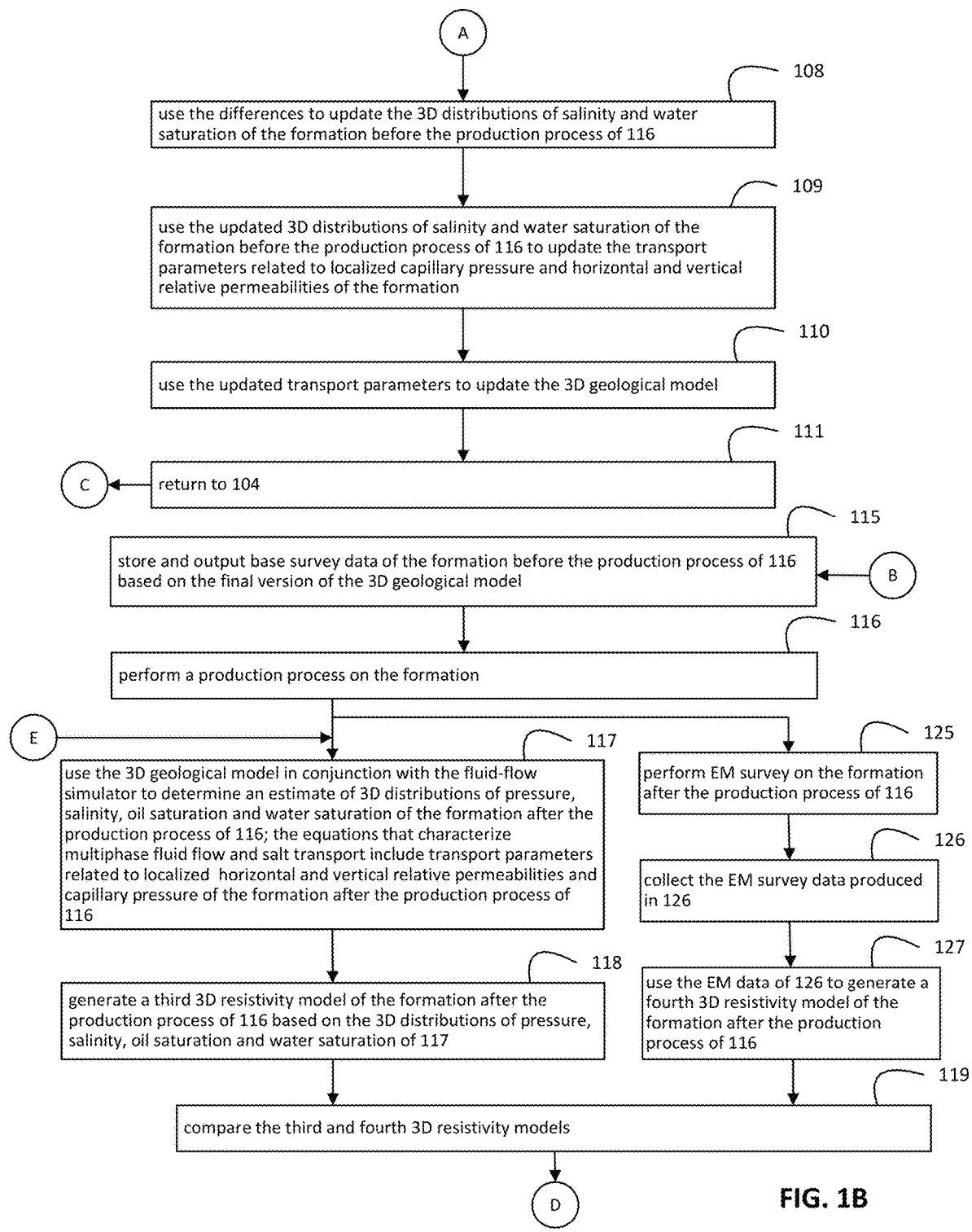
Figure 1C:
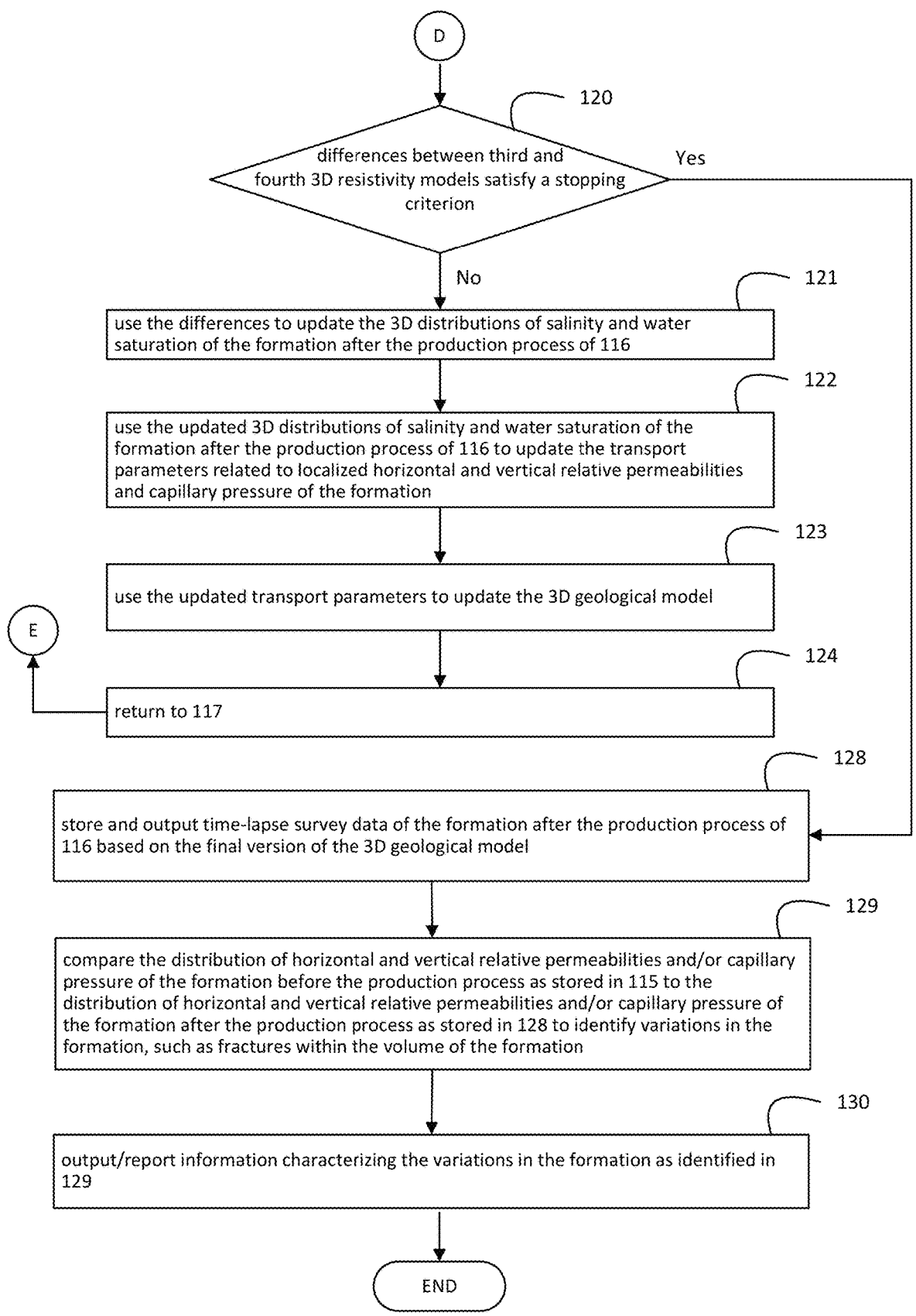

FIGS. 1A-1C, collectively, is a flow chart illustrating operations of a framework for characterizing distributions of relative permeabilities and capillary pressure in a hydrocarbon-bearing rock formation using time-lapse electromagnetic measurements in accordance with embodiments of the present disclosure. The framework begins in block 101 wherein wellbore logging operations and formation/fluid sampling and analysis operations are performed on the formation. The wellbore logging operations can utilize X-ray or gamma ray spectroscopy devices, nuclear magnetic resonance (NMR) devices, acoustic or sonic devices, electromagnetic devices or other suitable logging tools. Moreover, such measurements can be performed during drilling, such as with logging while drilling (LWD) or measurement while drilling (MWD configuration, as well as with a wireline configuration, for example. The formation/fluid sampling and analysis operations can utilize fluid sampling probes, downhole fluid analyzers, laboratory fluid analyzers, downhole core samplers and laboratory core analyzers. The formation/fluid sampling and analysis operations can measure porosity, permeability, hydrocarbon composition, gas/oil ratio (GOR), live-oil density and viscosity, carbon dioxide concentration, fluid pH and other formation and fluid properties. All of these measurements can be utilized to define attributes (properties) of the formation rock as well as attributes (properties) of the fluids contained in the formation rock over locations in the volumetric representation of the formation as represented by 3D geological model of the formation (block 103). The measurements can also be used to define parameters of the equations used by a fluid-flow simulator to characterize multiphase fluid flow and salt transport in the volumetric representation of the formation as represented by 3D geological model of the formation (block 104).

In block 102, the wellbore log data (produced by the wellbore logging operations of 101) and the formation/fluid test data (produced by the formation/fluid sampling and analysis operations of 101) are collected and stored in electronic form.

In block 103, the wellbore log data and the formation/fluid test data collected in 102 are used to generate a 3D geological model of the formation. The 3D geological model can include data that represents the 3D distributions of horizontal and vertical relative permeabilities, capillary pressure, water saturation and oil saturation of the formation. For example, the 3D geological model can include data that represents the 3D distribution of horizontal and vertical permeabilities for an oil phase in the formation, and horizontal and vertical permeabilities for a water phase in the formation.

In block 104, the 3D geological model (as initialized in 103 or updated in 110) is used in conjunction with a fluid-flow simulator that employs equations that characterize multiphase fluid flow and salt transport over time to determine an estimate of 3D distributions of pressure, salinity, oil saturation and water saturation in the formation before the production process of 116. The equations that characterize multiphase fluid flow and salt transport can include transport parameters related to localized horizontal and vertical relative permeabilities and capillary pressure of the formation.

In one embodiment, the fluid-flow simulator of 104 can model multiphase fluid flow using Darcy's law of the form:

$$v_i = -\frac{Kk_{ri}}{\mu_i}(\nabla P_i - \rho_i g) \quad \text{Eqn. (1)}$$

The fluid-flow simulator of 104 can also model salt transport using the following equation:

$$\frac{\partial(\emptyset \varphi S_w)}{\partial t} + \nabla\left(\varphi v_w - \frac{D\nabla \varphi}{1+\delta\varphi}\right) = 0 \quad \text{Eqn. (2)}$$

In these equations, $\mu_i$ is the phase viscosity; $v_i$, $P_i$, $S_w$ are superficial phase velocity, capillary pressure and water saturation respectively; $k_{ri}$ is the phase relative permeability functions; and the subscript i=w or o for the water and oil phase, respectively. Ø is the porosity in the formation, D is diffusivity, $\varphi$ is the volume fraction of saturated salt solution, g is gravity constant, and $\rho_i$ is phase density.

Prior knowledge of distributions of pressure, salinity and saturations in the reservoir can be used to build 3D geological model. Alternatively or additionally, the 3D geological model can be used to compute one or more synthetic logs, such as synthetic logs of pressure, resistivity, and other test data as a function of depth in one or more boreholes that traverse the formation. The synthetic logs can be compared to actual log data measured from the same borehole(s). By comparing the synthetical logs with the measured ones, we can adjust all the parameters (including the transport parameters, permeabilities and capillary pressure distributions) such that the 3D geological model is consistent with the measured log data. For example, the results of the fluid-flow simulator can be checked by history matching to production data from all wells within the reservoir volume being simulated. The results of the history matching can be used to adjust or tune the 3D geological model and/or the fluid-flow simulator, if desired In block 105, a first 3D resistivity model of the formation before the production process of 116 is generated based on the 3D distributions of pressure, salinity, oil saturation and water saturation produced in 104. In embodiments, pressure, salinity, oil saturation and water saturation can be related to resistivity by the Archie equation of the form:

$$\sigma = \frac{\sigma_w(\varphi)S_w^n \emptyset^m}{a} \quad \text{Eqn. (3)}$$

In this equation, $\alpha$ is the bulk conductivity of the formation, $\sigma_w$ is the fluid conductivity, $S_w$ is the water saturation, n and m are saturation and cementation exponents, respectively, and a is tortuosity exponent.

Note that the right side of Eqn. 3 includes water saturation $S_w$ and water conductivity $\sigma_w$, which depends on salinity. So, once the distributions of $S_w$ and $\sigma_w$ are determined, the distribution of conductivity (which is the reciprocal of resistivity) can be computed.

In block 112, an EM survey is performed on the formation before the production process of 116. The EM survey can include any one or more of cross-well EM measurements, STB EM measurements and BTS measurements performed on the formation. The EM survey can be performed in the reservoir area using the same wells used for the well logging operations and the formation/fluid sampling and analysis operations of 101.

In block 113, the EM data (produced by the EM survey of 112) is collected and stored in electronic form.

In block 114, the EM data collected in 113 is used to generate a second 3D resistivity model of the formation before the production process of 116. In embodiments, tomographic processing can be used to process EM data resulting from cross-EM measurement to generate a three-dimensional map of resistivity of the volumetric area between wellbores. In other embodiments, inversion processing of EM data resulting from STB EM measurement or BTS EM measurements can be used to solve for a 3D resistivity map of the volumetric area between a wellbore and the surface. Interpolation can possibly be used to determine resistivity values for parts of the second 3D resistivity model, if needed.

In block 106, the first 3D resistivity model of 105 and the second 3D resistivity model of 114 are compared to one another to determine a measure of the differences between the first and second 3D resistivity models.

In block 107, the measure of the differences between the first and second 3D resistivity models as determined in 106 is evaluated to determine if it satisfies a stopping criterion. If no, the operations continue to 108; and, if yes, the operations continue to 115. The stop criterion is a predefined parameter which allows an inversion process to stop after certain number of iterations. The stop criterion is normally defined based on resolution of measuring system, numerical accuracy and the nature of inversion process. From a mathematical point view, once the model difference is smaller than pre-defined criterion, then the two models are the same models.

In block 108, the measure of the differences between the first and second 3D resistivity models as determined in 107 can be used to update the 3D distributions of salinity and water saturation of the formation before the production process of 116.

In embodiments, the 3D distributions of salinity and water saturation of the formation can be updated in an inversion process. Specifically, the difference in the 3D resistivity models can provide guidelines of how to change the resistivity distributions in order to reduce the model difference. The resistivity distribution depends on the distributions of water saturation $S_w$ and salinity, therefore, changing the resistivity distribution will update salinity and water saturation distributions.

In block 109, the updated 3D distributions of salinity and water saturation of the formation before the production process of 116 as determined 108 can be used to update the transport parameters related to localized horizontal and vertical relative permeabilities and capillary pressure of the formation. For example, the updated salinity and water saturation $S_w$ distributions can be used in conjunction with the equations to update transport parameters by fitting more recently surveyed borehole logs.

In block 110, the updated transport parameters of 109 can be used to update the 3D geological model, and in block 111, the operations return to 104. As noted above, the updated transport parameters can be used to modify the 3D geological model and make it more consistent with all the measured logs and other geophysical data. In general, a geological model is defined by all the attributes for each cell, and the transport parameters are used to specify the attributes.

Note that the operations of 105 to 110 can be repeated to adjust or tune the transport parameters used by the fluid-flow simulator as well as the 3D geological model such that the resistivity values of the formation before the production process of 116 as estimated from the 3D geological model and the fluid-flow simulator satisfactorily match the resistivity values of the formation before the production process of 116 as estimated from the EM survey data. When such iterative processing is complete, the operations continue to 115.

In block 115, base survey data can be output and stored in electronic form. The base survey data can be extracted or derived from the final version of the 3D geological model when the stopping criterion is satisfied (i.e., the resistivity values of the formation before the production process of 116 as estimated from the 3D geological model and the fluid-flow simulator satisfactorily match the resistivity values of the formation before the production process of 116 as estimated from the EM survey data). The base survey data can represent 3D distributions of horizontal and vertical relative permeabilities, capillary pressure and possibly oil and water saturation of the formation before the production process of 116.

In block 116, a production process is performed on the formation.

In block 117, the 3D geological model is used in conjunction with the fluid-flow simulator that employs equations that characterize multiphase fluid flow and salt transport over time to determine an estimate of 3D distributions of pressure, salinity, oil saturation and water saturation in the formation after the production process of 116. The equations of the fluid-flow simulator that characterize multiphase fluid flow and salt transport can include transport parameters related to localized horizontal and vertical relative permeabilities and capillary pressure of the formation after the production process of 116. The equations used by the fluid-flow simulator can be similar to the equations of the fluid-flow simulator described above with respect to 104.

In block 118, a third 3D resistivity model of the formation after the production process of 116 is generated based on the 3D distributions of pressure, salinity, oil saturation and water saturation produced in 117. In embodiments, pressure, salinity, oil saturation and water saturation can be related to resistivity by the Archie equation as described above with respect to 105.

In block 125, an EM survey is performed on the formation after the production process of 116. The EM survey can include any one or more of cross-well EM measurements, STB EM measurements and BTS measurements performed on the formation. The EM survey can be performed in the reservoir area using the same wells used for the well logging operations and the formation/fluid sampling and analysis operations of 101.

In block 126, the EM data (produced by the EM survey of 125) is collected and stored in electronic form.

In block 127, the EM data collected in 126 is used to generate a fourth 3D resistivity model of the formation after the production process of 116. In embodiments, tomographic processing can be used to process EM data resulting from cross-EM measurement to generate a three-dimensional map of resistivity of the volumetric area between wellbores. In other embodiments, inversion processing of EM data resulting from STB EM measurement or BTS EM measurements can be used to solve for a 3D resistivity map of the volumetric area between a wellbore and the surface. Interpolation can possibly be used to determine resistivity values for parts of the fourth 3D resistivity model, if needed.

In block 119, the third 3D resistivity model of 118 and the fourth 3D resistivity model of 128 are compared to one another to determine a measure of the differences between the third and fourth 3D resistivity models.

In block 120, the measure of the differences between the third and fourth 3D resistivity models as determined in 120 is evaluated to determine if it satisfies a stopping criterion. If no, the operations continue to 121; and, if yes, the operations continue to 128. The stopping criterion can be similar to that described above for 107.

In block 121, the measure of the differences between the third and fourth 3D resistivity models as determined in 119 can be used to update the 3D distributions of salinity and water saturation of the formation after the production process of 116. These operations can be similar to those described above for 108.

In block 122, the updated 3D distributions of salinity and water saturation of the formation after the production process of 116 as determined at 121 can be used to update the transport parameters related to localized horizontal and vertical relative permeabilities and capillary pressure of the formation. These operations can be similar to those described above for 109.

In block 123, the updated transport parameters of 122 can be used to update the 3D geological model, and in block 124, the operations return to 117. The operations of 123 can be similar to those described above for 110.

Note that the operations of 117 to 124 can be repeated to adjust or tune the transport parameters used by the fluid-flow simulator as well as the 3D geological model such that the resistivity values of the formation after the production process of 116 as estimated from the 3D geological model and the fluid-flow simulator satisfactorily match the resistivity values of the formation after the production process of 116 as estimated from the EM survey data. When such iterative processing is complete, the operations continue to 128.

In block 128, time-lapse survey data can be output and stored in electronic form. The time-lapse survey data can be extracted or derived from the final version of the 3D geological model when the stopping criterion is satisfied (i.e., the resistivity values of the formation after the production process of 116 as estimated from the 3D geological model and the fluid-flow simulator satisfactorily match the resistivity values of the formation after the production process of 116 as estimated from the EM survey data). The time-lapse survey data can represent 3D distributions of horizontal and vertical relative permeabilities, capillary pressure and possibly oil and water saturation of the formation after the production process of 116.

In block 129, the distributions of horizontal and vertical relative permeabilities and/or capillary pressure of the formation before the production process as stored in 115 can be compared to the corresponding distributions of horizontal and vertical relative permeabilities and/or capillary pressure of the formation after the production process as stored in 128 to identify variations in the formation, such as fractures within the volume of the formation In block 130, information characterizing the variations in the formation as identified in 129 can be output or reported.

In this manner, for an oil field that has undergone a production process (such as, but not limited to, an EOR process), the time-lapse cross-well EM, STB EM and BTS EM data can be collected before and after the production process, and such EM data be used to obtain a dynamic 3D distribution of horizontal and vertical relative permeabilities and capillary pressure. In addition, if time-lapse production and formation test data are collected from the wells within the reservoir, then the history matching of the measured data at wells can further validate the calculated horizontal and vertical relative permeabilities and capillary pressure. Note that since the cross-well EM, STB EM and BTS EM data are collected in a reservoir scale, and the resulting subsurface resistivity models provide continuous 3D distribution, the calculated horizontal and vertical relative permeabilities and capillary pressure are 3D in nature and can reveal lateral variations in formation volume, such as fractures within the volume being surveyed.

Figures 2A, 2B:
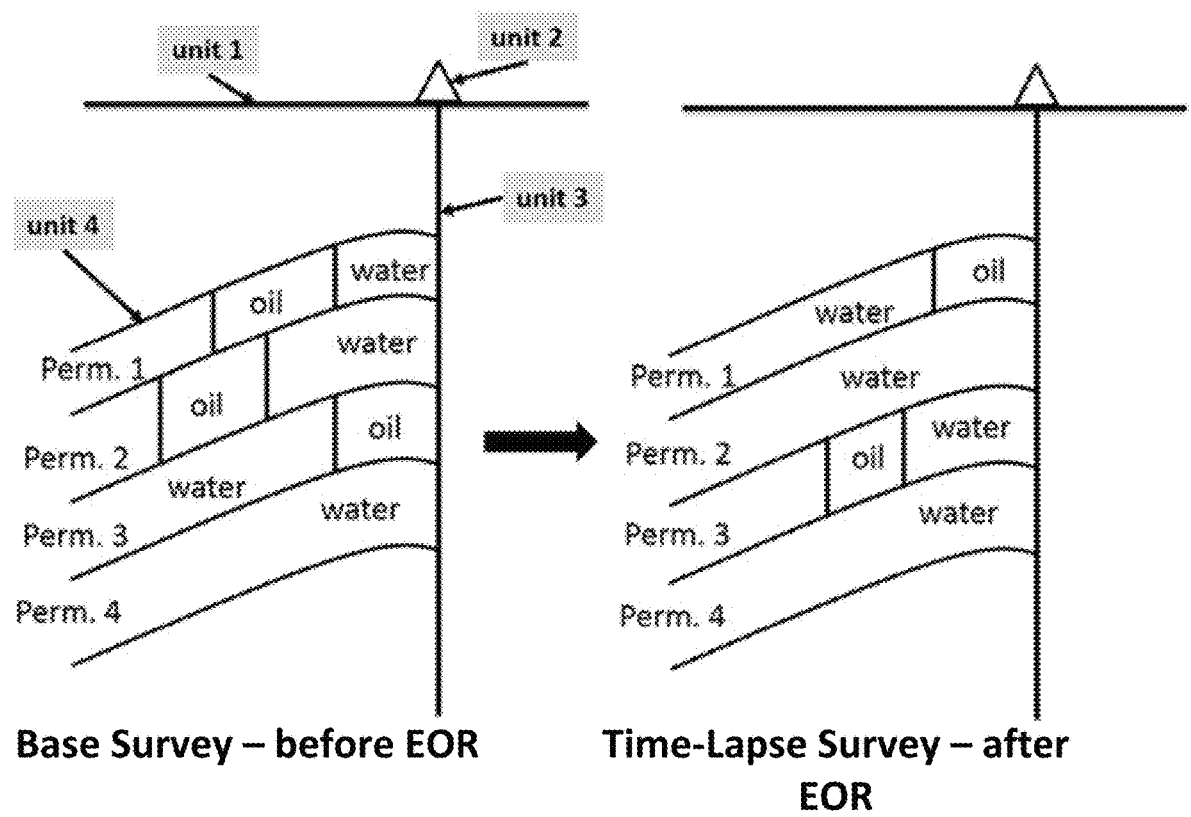
FIGS. 2A and 2B show possible visual representations of base survey data and time-lapse survey data, respectively, which can be generated by the operations of the framework of FIGS. 1A-1C in accordance with embodiments of the present disclosure.

FIGS. 2A and 2B show possible visual representations of the base survey data and time-lapse survey data, respectively. These visual representations provide detailed knowledge of the relative permeabilities before and after an EOR process (e.g., fluid injection) in order to help understand the movements of oil and water near a production well. Such knowledge can enhance oil production and possibly help prevent early water breakthrough.

Figure 3:
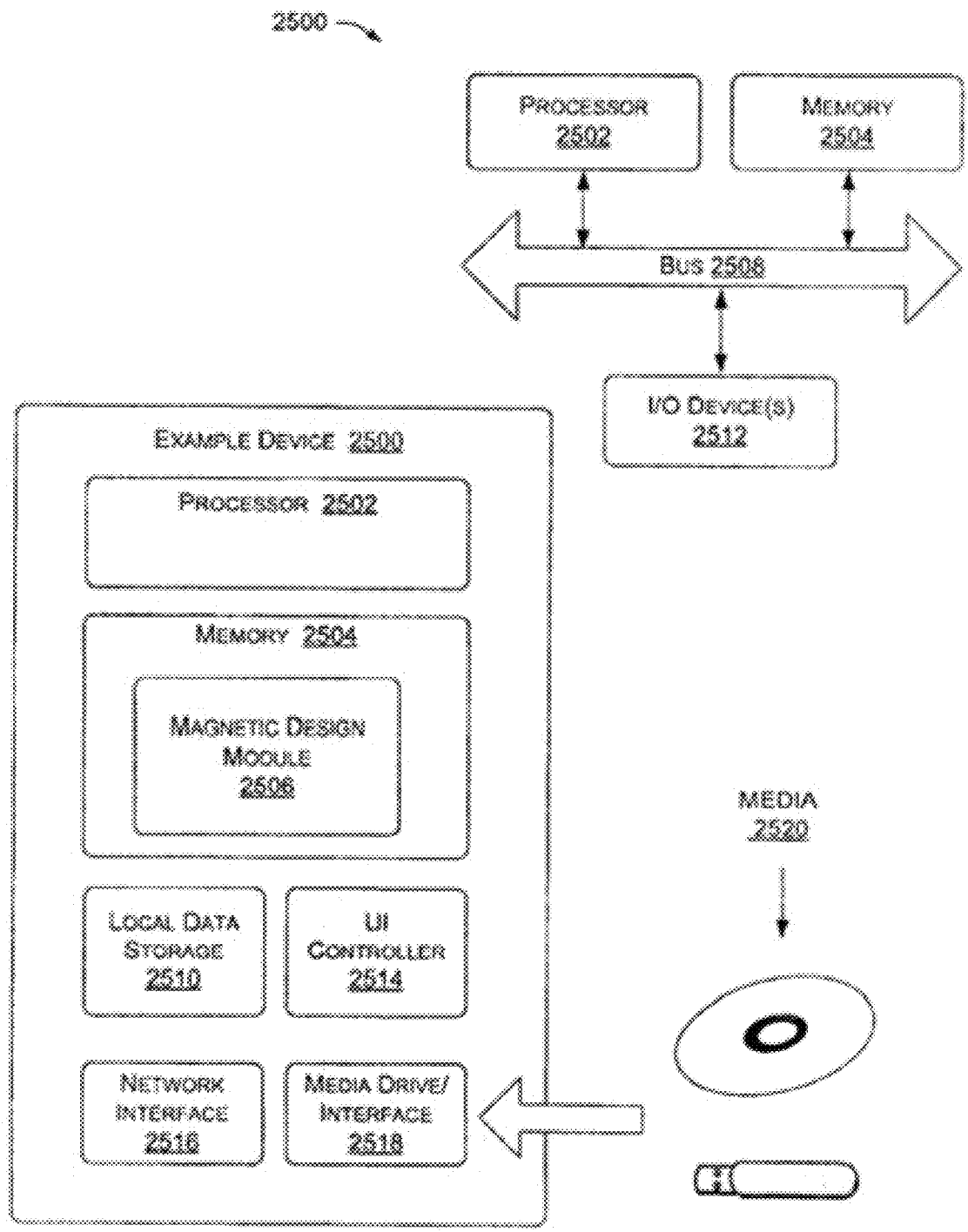
FIG. 3 is a functional block diagram of a computing device that can be used to embody parts of the framework of the present disclosure.

FIG. 3 illustrates an example device 2500, with a processor 2502 and memory 2504 that can be configured to implement various embodiments of the framework as discussed in this disclosure. Memory 2504 can also host one or more databases and can include one or more forms of volatile data storage media such as random-access memory (RAM), and/or one or more forms of nonvolatile storage media (such as read-only memory (ROM), flash memory, and so forth).

Device 2500 is one example of a computing device or programmable device and is not intended to suggest any limitation as to scope of use or functionality of device 2500 and/or its possible architectures. For example, device 2500 can comprise one or more computing devices, programmable logic controllers (PLCs), etc.

Further, device 2500 should not be interpreted as having any dependency relating to one or a combination of components illustrated in device 2500. For example, device 2500 may include one or more of a computer, such as a laptop computer, a desktop computer, a mainframe computer, etc., or any combination or accumulation thereof.

Device 2500 can also include a bus 2508 configured to allow various components and devices, such as processors 2502, memory 2504, and local data storage 2510, among other components, to communicate with each other.

Bus 2508 can include one or more of any of several types of bus structures, including a memory bus or memory controller, a peripheral bus, an accelerated graphics port, and a processor or local bus using any of a variety of bus architectures. Bus 2508 can also include wired and/or wireless buses.

Local data storage 2510 can include fixed media (e.g., RAM, ROM, a fixed hard drive, etc.) as well as removable media (e.g., a flash memory drive, a removable hard drive, optical disks, magnetic disks, and so forth).

One or more input/output (I/O) device(s) 2512 may also communicate via a user interface (UI) controller 2514, which may connect with I/O device(s) 2512 either directly or through bus 2508.

In one possible implementation, a network interface 2516 may communicate outside of device 2500 via a connected network.

A media drive/interface 2518 can accept removable tangible media 2520, such as flash drives, optical disks, removable hard drives, software products, etc. In one possible implementation, logic, computing instructions, and/or software programs comprising elements of module 2506 may reside on removable media 2520 readable by media drive/interface 2518.

In one possible embodiment, input/output device(s) 2512 can allow a user (such as a human annotator) to enter commands and information to device 2500 and also allow information to be presented to the user and/or other components or devices. Examples of input device(s) 2512 include, for example, sensors, a keyboard, a cursor control device (e.g., a mouse), a microphone, a scanner, and any other input devices known in the art. Examples of output devices include a display device (e.g., a monitor or projector), speakers, a printer, a network card, and so on.

Various processes of present disclosure may be described herein in the general context of software or program modules, or the techniques and modules may be implemented in pure computing hardware. Software generally includes routines, programs, objects, components, data structures, and so forth that perform particular tasks or implement particular abstract data types. An implementation of these modules and techniques may be stored on or transmitted across some form of tangible computer-readable media. Computer-readable media can be any available data storage medium or media that is tangible and can be accessed by a computing device. Computer readable media may thus comprise computer storage media. "Computer storage media" designates tangible media, and includes volatile and non-volatile, removable and non-removable tangible media implemented for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information, and which can be accessed by a computer. Some of the methods and processes described above, can be performed by a processor. The term "processor" should not be construed to limit the embodiments disclosed herein to any particular device type or system. The processor may include a computer system. The computer system may also include a computer processor (e.g., a microprocessor, microcontroller, digital signal processor, or general purpose computer) for executing any of the methods and processes described above.

Some of the methods and processes described above, can be implemented as computer program logic for use with the computer processor. The computer program logic may be embodied in various forms, including a source code form or a computer executable form. Source code may include a series of computer program instructions in a variety of programming languages (e.g., an object code, an assembly language, or a high-level language such as C, C++, or JAVA). Such computer instructions can be stored in a non-transitory computer readable medium (e.g., memory)

and executed by the computer processor. The computer instructions may be distributed in any form as a removable storage medium with accompanying printed or electronic documentation (e.g., shrink wrapped software), preloaded with a computer system (e.g., on system ROM or fixed disk), or distributed from a server or electronic bulletin board over a communication system (e.g., the Internet or World Wide Web).

Alternatively or additionally, the processor may include discrete electronic components coupled to a printed circuit board, integrated circuitry (e.g., Application Specific Integrated Circuits (ASIC)), and/or programmable logic devices (e.g., a Field Programmable Gate Arrays (FPGA)). Any of the methods and processes described above can be implemented using such logic devices.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A method for characterizing a subterranean formation, comprising:
   i) generating a three-dimensional geological model of the formation;
   ii) using the three-dimensional geological model of the formation in conjunction with a fluid-flow simulator to generate a first three-dimensional distribution of resistivity of the formation;
   iii) collecting electromagnetic survey data of the formation;
   iv) generating a second three-dimensional distribution of resistivity of the formation based on the electromagnetic survey data;
   v) updating the three-dimensional geological model of the formation based on differences between the first and second three-dimensional distributions of resistivity of the formation;
   vi) repeating the operations of ii) and v) until differences between the first and second three-dimensional distributions of resistivity of the formation satisfy a stopping criterion;
   vii) storing data characterizing properties of the formation based on the three-dimensional geological model of the formation that results from vi);
   vii) generating a third three-dimensional distribution of resistivity of the formation after an enhanced oil recovery process;
   viii) generating a fourth three-dimensional distribution of resistivity of the formation based upon an electromagnetic survey of the formation;
   ix) calculating differences between the third and fourth three-dimensional distributions; and
   x) updating the three-dimensional geological model of the formation based upon the differences.

2. A method according to claim 1, wherein:
the three-dimensional geological model of the formation includes distributions of formation properties selected from the group consisting of relative permeabilities, horizontal and vertical relative permeabilities, capillary pressure, water saturation and oil saturation.

3. A method according to claim 1, wherein:
the operations of i) to vii) are performed before subjecting the formation to an enhanced oil recovery process such that the data stored in vii) represents a three-dimensional distribution of at least one property of the formation before the enhanced oil recovery process; and
the operations of i) to vii) are repeated after subjecting the formation to the enhanced oil recovery process such that the data stored in vii) represents a three-dimensional distribution of at least one property of the formation after the enhanced oil recovery process.

4. A method according to claim 3, wherein:
the operations of iii) before and after the enhanced oil recovery process collect time-lapsed electromagnetic data.

5. A method according to claim 3, further comprising:
comparing the three-dimensional distribution of at least one property of the formation before the enhanced oil recovery process to the three-dimensional distribution of at least one property of the formation after the enhanced oil recovery process to identify variations in the formation.

6. A method according to claim 5, wherein:
the variations comprise fractures within the formation.

7. A method according to claim 5, further comprising:
outputting information characterizing the variations in the formation.

8. A method according to claim 5, wherein:
the three-dimensional distribution of at least one property of the formation before the enhanced oil recovery process represents at least one formation property selected from the group consisting of relative permeabilities, horizontal and vertical relative permeabilities, capillary pressure, water saturation, and oil saturation; and
the three-dimensional distribution of at least one property of the formation after the enhanced oil recovery process represents at least one formation property selected from the group consisting of relative permeabilities, horizontal and vertical relative permeabilities, capillary pressure, water saturation, and oil saturation.

9. A method according to claim 1, wherein:
the operations of ii) employs history matching to production data to adjust at least one of the three-dimensional geological model and the fluid-flow simulator.

10. A method according to claim 1, wherein:
the operations of ii) configure the three-dimensional geological model of the formation and fluid-flow simulator to estimate three-dimensional distributions of pressure, salinity, oil saturation and water saturation in the formation, which are used to determine the first three-dimensional distribution of resistivity of the formation.

11. A method according to claim 1, wherein:
the operations of v) employ differences between the first and second three-dimensional distributions of resistivity of the formation to update 3D distributions of salinity and water saturation of the formation, use the updated 3D distributions of salinity and water saturation of the formation to update transport parameters related to localized relative permeabilities and capillary pressure of the formation, and use the updated transport parameters to update the three-dimensional geological model of the formation.

12. A method according to claim 1, wherein:
the electromagnetic survey data of iii) is obtained from at least one of cross-well electromagnetic measurements, surface-to-borehole electromagnetic measurements, and borehole-to-surface electromagnetic measurements.

13. A method according to claim 1, wherein:
the operations of i) to vii) are performed by a processor.

14. A method for analyzing a subterranean formation subjected to an enhanced oil recovery process the method comprising:
performing a first sequence of operations before the enhanced oil recovery process and a second sequence of operations after the enhanced oil recovery process;
wherein the first sequence of operations involves
   i) generating a three-dimensional geological model of the formation;
   ii) using the three-dimensional geological model of the formation in conjunction with a fluid-flow simulator to generate a first three-dimensional distribution of resistivity of the formation before the enhanced oil recovery process;
   iii) collecting electromagnetic survey data of the formation before the enhanced oil recovery process;
   iv) generating a second three-dimensional distribution of resistivity of the formation before the enhanced oil recovery process based on the electromagnetic survey data of the formation before the enhanced oil recovery process;
   v) updating the three-dimensional geological model of the formation based on differences between the first and second three-dimensional distributions of resistivity of the formation;
   vi) repeating the operations of ii) and v) until differences between the first and second three-dimensional distributions of resistivity of the formation satisfy a stopping criterion; and
   vii) storing data characterizing properties of the formation before the enhanced oil recovery process based on the three-dimensional geological model of the formation that results from vi); and
wherein the second sequence of operations involves
   viii) using the three-dimensional geological model of the formation in conjunction with the fluid-flow simulator to generate a third three-dimensional distribution of resistivity of the formation after the enhanced oil recovery process;
   ix) collecting electromagnetic survey data of the formation after the enhanced oil recovery process;
   x) generating a fourth three-dimensional distribution of resistivity of the formation after the enhanced oil recovery process based on the electromagnetic survey data of the formation after the enhanced oil recovery process;
   xi) updating the three-dimensional geological model of the formation based on differences between the third and fourth three-dimensional distributions of resistivity of the formation;
   xii) repeating the operations of viii) and xi) until differences between the third and fourth three-dimensional distributions of resistivity of the formation satisfy a stopping criterion; and
   xiii) storing data characterizing properties of the formation after the enhanced oil recovery process based on the three-dimensional geological model of the formation that results from xii).

15. A method according to claim 14, wherein:
the three-dimensional geological model of the formation includes distributions of formation properties selected from the group consisting of relative permeabilities, horizontal and vertical relative permeabilities, capillary pressure, water saturation and oil saturation.

16. A method according to claim 14, wherein:
the operations of iii) and ix) collect time-lapsed electromagnetic data.

17. A method according to claim 14, further comprising:
comparing the data of vii) and the data of xiii) to identify variations in the formation.

18. A method according to claim 14, wherein:
the operations of i) to xiii) are performed by a processor.

* * * * *